United States Patent [19]

Hirayama

[11] Patent Number: 5,517,322

[45] Date of Patent: May 14, 1996

[54] APPARATUS FOR RECORDING AND REPRODUCING VIDEO SIGNALS WITH PREEMPHASIS AND DEEMPHASIS PROCESSES

[75] Inventor: Ryo Hirayama, Kamakura, Japan

[73] Assignee: Victor Company of Japan, Ltd., Yokohama, Japan

[21] Appl. No.: 415,031

[22] Filed: Apr. 3, 1995

Related U.S. Application Data

[63] Continuation of Ser. No. 94,575, Jul. 21, 1993, abandoned.

[30] Foreign Application Priority Data

Jul. 21, 1992 [JP] Japan .................................. 4-215597
Jul. 22, 1992 [JP] Japan .................................. 4-216337

[51] Int. Cl.⁶ .................................................. H04N 5/76
[52] U.S. Cl. .......................... 358/335; 358/340; 348/607; 348/613; 360/25; 360/33.1
[58] Field of Search ...................... 358/335, 310, 358/327, 330, 340; 360/29, 30, 33.1, 25, 27; 348/607, 613

[56] References Cited

U.S. PATENT DOCUMENTS

| | | | |
|---|---|---|---|
| 4,618,893 | 10/1986 | Hirota et al. | 358/340 |
| 5,050,009 | 9/1991 | Takahashi et al. | 360/33.1 |
| 5,223,942 | 6/1993 | Sakaegi et al. | 358/310 |
| 5,257,109 | 10/1993 | Minakawa | 358/330 |

FOREIGN PATENT DOCUMENTS

| | | |
|---|---|---|
| 0120615 | 10/1984 | European Pat. Off. . |
| 0440242 | 8/1991 | European Pat. Off. . |
| 2312375 | 12/1990 | Japan . |
| 39679 | 2/1991 | Japan . |
| 3250887 | 11/1991 | Japan . |
| 5048995 | 2/1993 | Japan . |

*Primary Examiner*—Tommy P. Chin
*Assistant Examiner*—Khoi Truong
*Attorney, Agent, or Firm*—Lowe, Price, Leblanc & Becker

[57] ABSTRACT

A video signal recording and reproducing apparatus comprises a magnetic tape (4) into which video signals are recorded, A preemphasis circuit (35) modifies the video signals prior to the recording into the magnetic tape (4), so as to increase magnitude of high-frequency components with respect to magnitude of low-frequency components on time base. A record start or end ID signal is generated in response to a record start or end signal in an ID signal recording circuit (36) which memorizes this ID signal into a corresponding portion of the magnetic tape (4). A mute circuit (46) resets the preemphasis circuit (35) in response to the record start or end signal. There is further provided a deemphasis circuit (37) for modifying the video signals after reproducing from the magnetic tape (4) in a complementary manner with respect to the preemphasis circuit (35), so as to decrease magnitude of high-frequency components with respect to magnitude of low-frequency components on time base. An ID signal detecting circuit (38) detects the record start or end ID signal from the magnetic tape (4) and generates an ID detecting signal. A mute circuit (49) resets the deemphasis circuit (37) in response to the ID detecting signal.

2 Claims, 14 Drawing Sheets

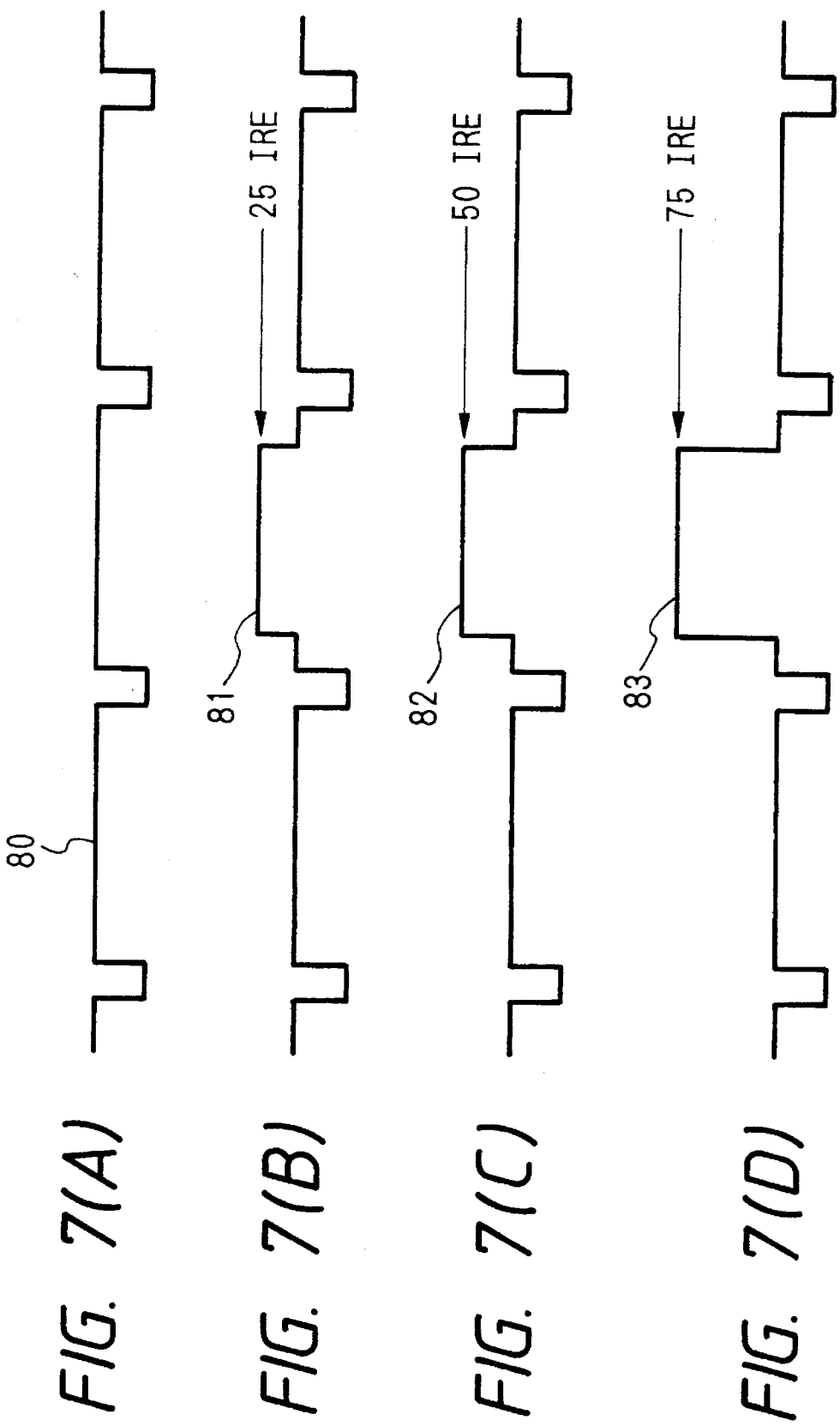

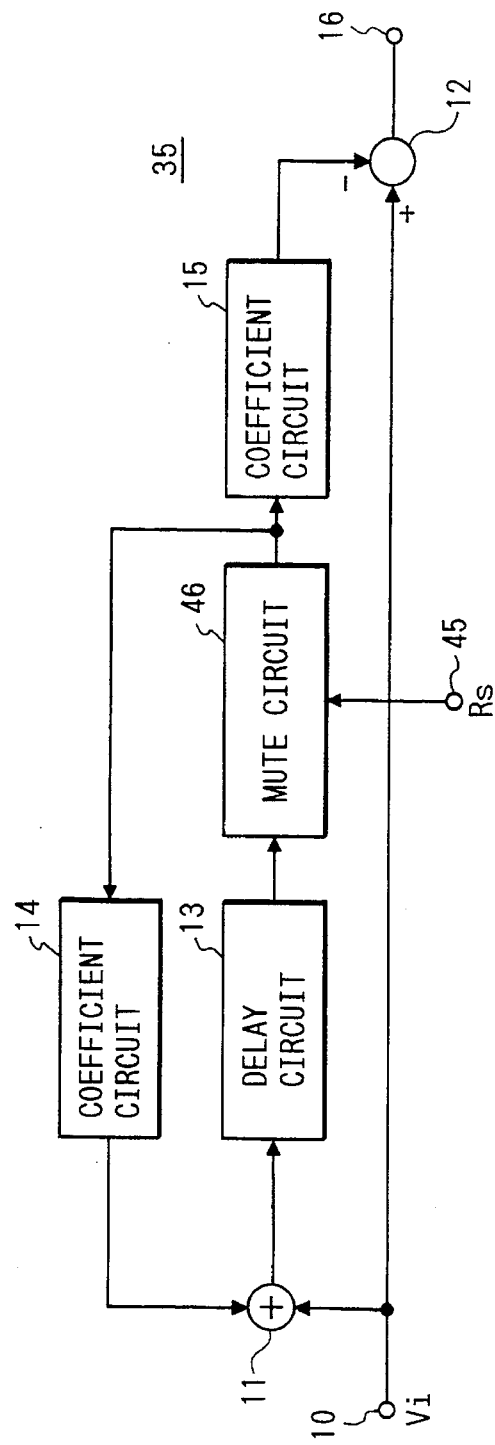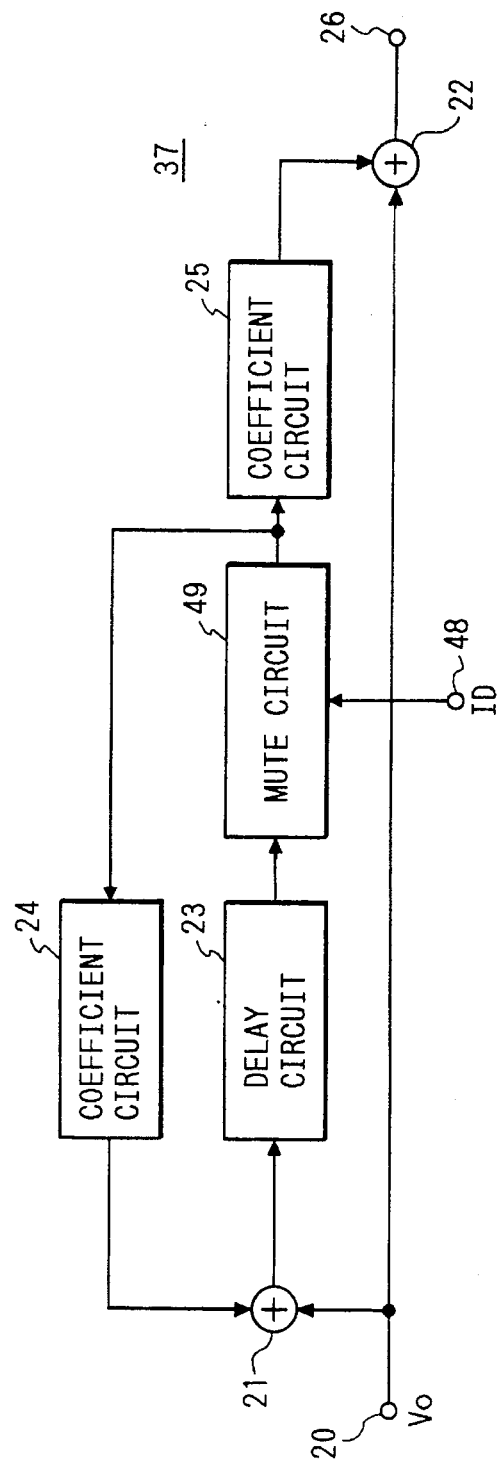

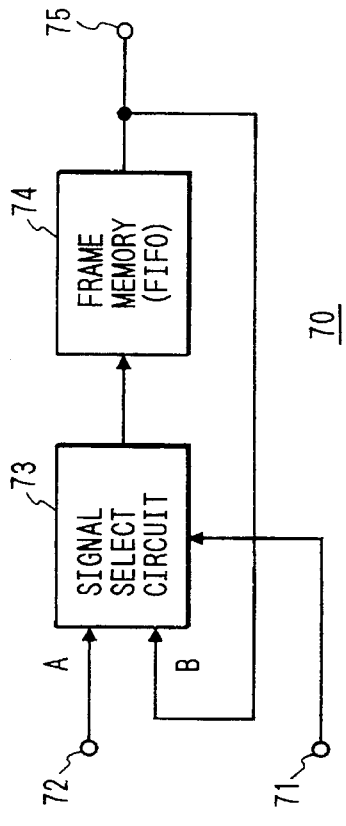
FIG. 14
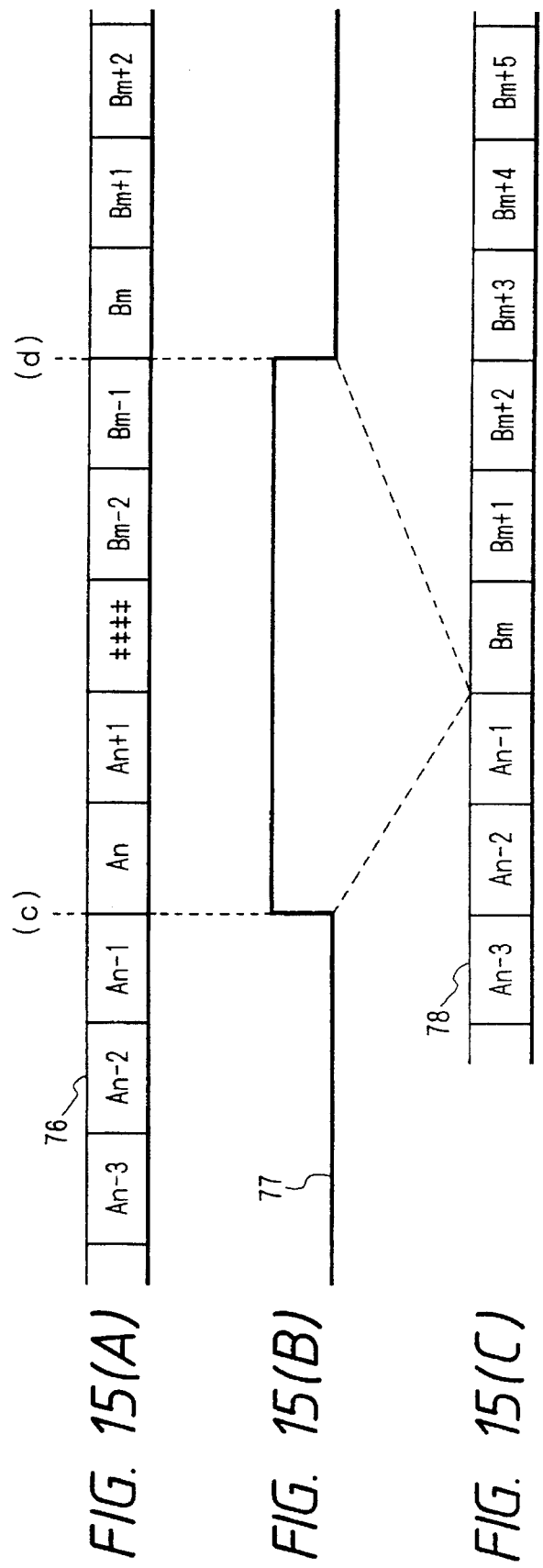
FIG. 15(A)
FIG. 15(B)
FIG. 15(C)

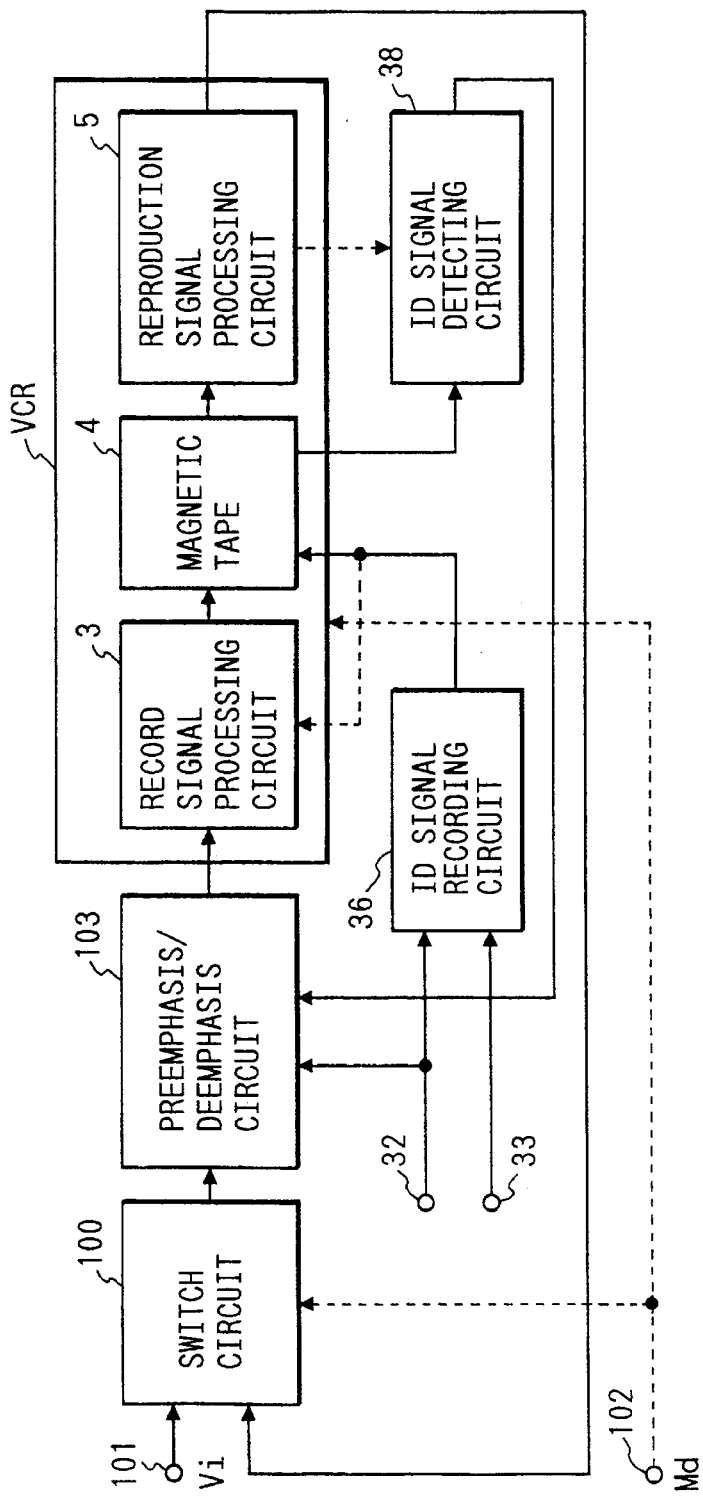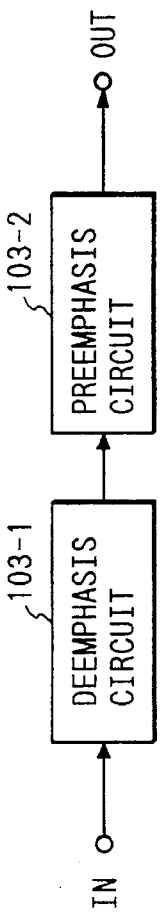

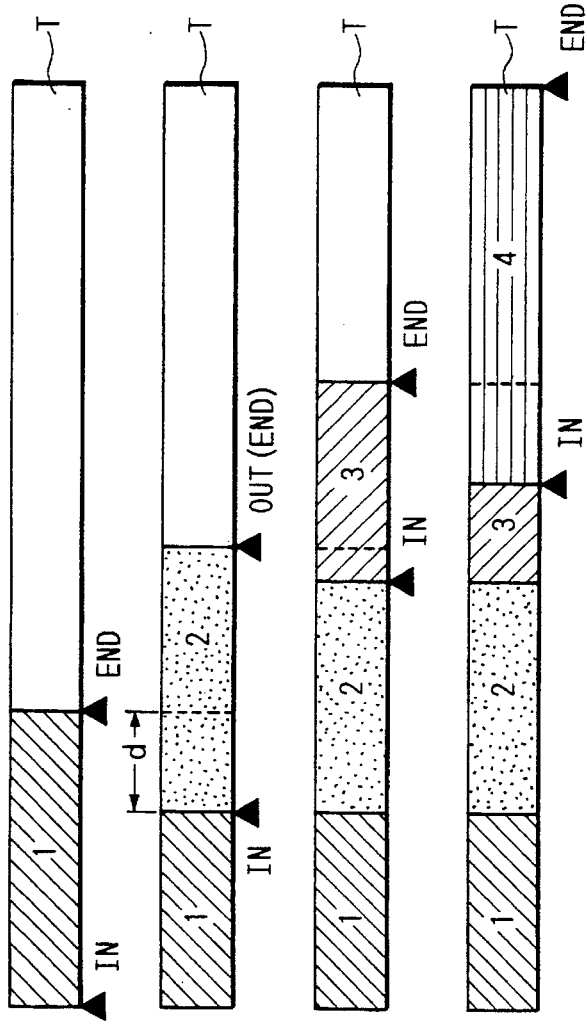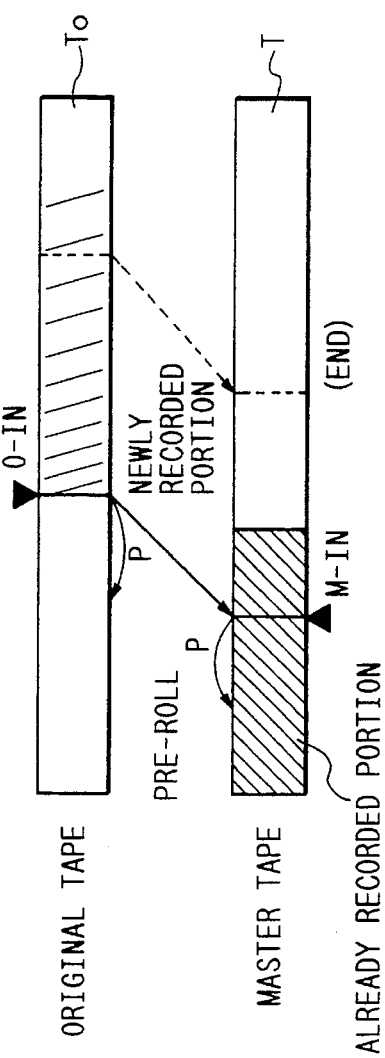
FIG. 25(A) PRIOR ART
FIG. 25(B)
FIG. 25(C)
FIG. 25(D)
FIG. 26 PRIOR ART

APPARATUS FOR RECORDING AND REPRODUCING VIDEO SIGNALS WITH PREEMPHASIS AND DEEMPHASIS PROCESSES

This application is a continuation of application Ser. No. 08/094,575 filed Jul. 21, 1993 now abandoned.

BACKGROUND OF THE INVENTION

1. Field of the Invention

The present invention relates generally to an apparatus for recording and reproducing video signals, which includes a preemphasis means for modifying video signals on time base prior to recording into the recording medium and a deemphasis means for modifying the video signals in a complementary manner, thereby reducing the effects of noise introduced in the system.

2. Description of the Prior Art

In the recording of video signals into the recording medium such a magnetic tape and the reproduction of the same, there is known that reducing the effects of noise is a big issue. A method having been conventionally used to encounter this problem is the combination of a preemphasis process wherein the magnitude of high frequency components is increased with respect to the magnitude of others and a deemphasis process wherein the magnitude of high frequency components is decreased with respect to the magnitude of others in a complementary manner. With this method, an S/N ratio of the video signal can be improved. For example, Japanese Patent No. 3-9679/1991 discloses a recording and reproducing apparatus carrying out such preemphasis and deemphasis processes.

FIG. 20 is a circuit block diagram showing such a conventional video recording and reproducing apparatus. In the drawing, an input video signal Vi arriving from an input terminal 1 is supplied to a preemphasis circuit 2. The preemphasis circuit 2 modifies the input video signal Vi on time base through a preemphasis process wherein the magnitude of high frequency components is increased with respect to the magnitude of low frequency components. The video signal Vi is then supplied into a record signal processing circuit 3, in which the video signal Vi is, for example, frequency modulated into a form suitable for the recording. The video signal Vi, thus modulated in the record signal processing circuit 3, is supplied to a magnetic head (not shown but generally well known) through an appropriate amplifier (not shown). The magnetic head interacts with a magnetic tape 4 to magnetically record the video signal Vi into the magnetic tape 4. The recording operation is completed in this manner.

In the reproduction of video signals from the magnetic tape 4, a video signal Vo recorded in the magnetic tape 4 is read out through the magnetic head and the amplifier. A reproduction signal processing circuit 5 receives this output video signal Vo and demodulates it. Subsequently, the video signal Vo is supplied into a deemphasis circuit 6. The deemphasis circuit 6 modifies the video signal Vo through a deemphasis process wherein the magnitude of high frequency components is decreased with respect to the magnitude of the low frequency components. The deemphasis circuit 6 and the preemphasis circuit 2 are complementary with each other. The video signal Vo is then transmitted to other components from an output terminal 7.

FIG. 21 shows a circuit configuration of the preemphasis circuit 2. In the drawing, the input video signal Vi arriving an input terminal 10 is supplied to both an adder circuit 11 and a subtracter circuit 12. The video signal Vi outputted from the adder circuit 11 is subsequently supplied into a delay circuit 13. The delay circuit 13 has a delay time corresponding to 2m fields or {(2m+1) fields–0.5H}, where m=0, 1, 2, . . . and H being one horizontal period.

The delayed video signal Vi, generated from the delay circuit 13, is then supplied into a coefficient circuit 14, in which the delayed video signal Vi is multiplied by a predetermined coefficient K1 to reduce its magnitude. The delayed video signal Vi is thereafter fed back from the coefficient circuit 14 to the adder circuit 11 and added with a succeeding video signal Vi supplied from the input terminal 10. An output signal, i.e. a result of the addition in the adder circuit 11, is then supplied into the delay circuit 13.

The delayed video signal Vi, generated from the delay circuit 13, is meanwhile supplied into a coefficient circuit 15, in which the delayed video signal Vi is multiplied by a predetermined another coefficient K2. The delayed video signal Vi is thereafter supplied into the subtracter circuit 12 and subtracted from the succeeding video signal Vi supplied from the input terminal 10. The delayed video signal Vi, obtained from the coefficient circuit 15, corresponds to video signals inputted in advance by a plurality of predetermined periods equivalent to one field and its magnification. As a result of this subtraction, the subtracter 12 produces a video signal Vi having a preemphasis characteristic in which the magnitude of high frequency components is enhanced on time base with respect to the magnitude of low frequency components. The video signal Vi is thereafter transmitted to the record signal processing circuit 3 through an output terminal 16.

FIG. 22 shows a circuit configuration of the deemphasis circuit 6. The output video signal Vo, supplied from the reproduction signal processing circuit 5 preceding the deemphasis circuit 6, is taken in through an input terminal 20. The output video signal Vo, having the preemphasis characteristic, is supplied to adder circuits 21 and 22. The video signal Vo outputted from the adder circuit 21 is subsequently supplied into a delay circuit 23. The delay circuit 23 has the same delay time as that of the delay circuit 13 of FIG. 21.

The delayed video signal Vo, generated from the delay circuit 23, is then supplied into a coefficient circuit 24, in which the delayed video signal Vo is multiplied by a predetermined coefficient N1. The delayed video signal Vo is thereafter fed back from the coefficient circuit 24 to the adder circuit 21 and added with a succeeding video signal Vo arriving from the input terminal 20. An output signal, i.e. a result of the addition in the adder circuit 21, is then supplied into the delay circuit 23.

The delayed video signal Vo, generated from the delay circuit 23, is meanwhile supplied into a coefficient circuit 25, in which the delayed video signal Vo is multiplied by a predetermined another coefficient N2. The delayed video signal Vo is thereafter supplied into the adder circuit 22 and added with the succeeding video signal Vo supplied from the input terminal 20. As a result of this addition, the adder 22 produces the video signal Vo having a deemphasis characteristic in which the magnitude of high frequency components is reduced on time base with respect to the magnitude of low frequency components.

The deemphasis characteristic obtained in this deemphasis circuit 6 is complementary with the preemphasis characteristic obtained in the preemphasis circuit 2. This means that the deemphasis circuit 6 can reconstruct the video signal into the original form. Namely, the video signal Vo produced from the adder 22 is equivalent in its waveform with the input video signal Vi arriving the input terminal 10 of the preemphasis circuit 2.

FIGS. 23 and 24 show another examples of the preemphasis circuit and deemphasis circuit, respectively. Components denoted by the same reference numerals as those of FIG. 21 and 22 show like parts and, therefore, will no more be explained. These examples are equivalent to the previous example in that they can provide preemphasis and deemphasis characteristics similar to those of the previous examples.

Furthermore, in editing video tape, electronic editing has been conventionally used in the field of VCR related technologies. The electronic editing is classified into several modes, one of which is called as an assemble mode. This assemble mode will be explained hereinafter with reference to FIGS. 25(A)–25(D).

As shown in the drawings, this assembly mode is roughly characterized in that necessary portions of programs are successively recorded on a master tape T. While a start timing of recording is strictly determined, an end timing of recording is not specially designated in this editing mode. If a sufficient time has passed to record a necessary portion, the recording is ended at an appropriate timing as shown in FIG. 25(A). After the editing of the first cut shown in FIG. 25(A), the master tape T is rewound by an amount d as shown in FIG. 25(B). This rewind amount d should be identical with an unnecessary portion recorded at the end region of the first cut. Then, a second cut is edited from a start timing newly set in this manner, as shown in FIG. 25(B). FIGS. 25(c) and 25(D) which respectively show third and fourth cuts being edited in the same manner.

FIG. 26 shows the mutual relationship, i.e. recording sequence, between an original tape TO and the master tape T. A point 0-IN represents a playback start point from which the original tape TO starts playback. Likewise a point M-IN represents a recording start point from which the master tape T begins recording. After these points O-IN and M-IN have been both specified, these original and master tapes T0 and T are rewound a little bit by the same amount p. This rewind motion is referred to as "pre-roll". Next, both tapes T0 and T initiate travelling simultaneously in playback mode. As soon as the both tapes T0, T reach the specified points O-IN and M-IN, the master tape T is switched into the record mode to start recording from this point M-IN.

Although the combination of above-described preemphasis and deemphasis processes associated in a complementary manner brings an excellent improvement of S/N ratio, this combination on the other hand causes a problem when the assemble mode electronic editing is carried out. In more detail, each of the preemphasis and deemphasis circuits 2, 6 of FIG. 20 constitutes a circular type noise reduction circuit. This circuitry feature, although advantageous in the noise reduction, becomes a direct cause of undesirable residual image or other adverse effects when video signals are recorded together with another video signals in an overlapped manner according to the assemble mode editing explained with reference to FIGS. 25(A)–25(D).

Let us suppose that a certain region of the magnetic tape 4 already stores video signals recorded by the use of preemphasis process. And, another video signals are newly recorded from a point on or before the end of this already recorded region. As the previous video signals are still circulated in a feedback loop consisting of the delay circuit 13, coefficient circuit 14, and adder circuit 11 in the beginning of the recording of newly recorded video signals, the newly recorded video images are applied the preemphasis process on the basis of those circulated previous video images and, subsequently, recorded on the magnetic tape 4.

In reproducing video signals newly recorded in this manner, the deemphasis circuit 6 still circulates the previous video signals in its feedback loop and, therefore, carries out the deemphasis process on the basis of the previous video signals.

This discrepancy of video signals to be processed in the preemphasis and deemphasis circuits, occurring temporarily in the switching stage of video signals from the previous ones to the present ones, becomes a great cause of residual images and other adverse effects.

The inconvenience of residual images and other adverse effects derived from the circular nature of the preemphasis and deemphasis circuits would be also serious in the case where the previously recorded region succeeds the end of the newly recorded region because similar discrepancy occurs in the preemphasis and deemphasis circuits in the switching stage of video signals.

SUMMARY OF THE INVENTION

Accordingly, an object of the present invention is to remove above-described problems encountered in the prior art. In order to accomplish the object of the present invention, a first aspect of the present invention provides a video signal recording apparatus for recording a video signal onto a recording medium comprising: preemphasis means for modifying said video signal prior to recording onto said recording medium, so as to increase magnitude of high-frequency components of said video signal with respect to magnitude of low-frequency components thereof; means for providing a record start signal representing an initiation of recording of said video signal; identification signal recording means for generating a record start identification signal in response to said record start signal and for recording said record start identification signal onto a corresponding portion of said recording medium; and reset means for resetting said preemphasis means in response to said record start signal.

A second aspect of the present invention provides a video signal recording apparatus for recording a video signal onto a recording medium comprising: preemphasis means for modifying said video signal prior to recording onto said recording medium, so as to increase magnitude of high-frequency components of said video signal with respect to magnitude of low-frequency components thereof; means for providing a record end signal representing a termination of recording of said video signal; and identification signal recording means for generating a record end identification signal in response to said record end signal and for recording said record end identification signal onto a corresponding portion of said recording medium.

Furthermore, a third aspect of the present invention provides a video signal recording and reproducing apparatus for recording and reproducing a video signal onto and from a recording medium comprising: preemphasis means for modifying said video signal prior to recording onto said recording medium, so as to increase magnitude of high-frequency components of said video signal with respect to magnitude of low-frequency components thereof; means for providing a record start signal representing an initiation of recording of said video signal; identification signal recording means for generating a record start identification signal in response to said record start signal and for recording said record start identification signal onto a corresponding portion of said recording medium; first reset means for resetting said preemphasis means in response to said record start signal; deemphasis means for modifying said video signal after reproduction from said recording medium, so as to decrease magnitude of high-frequency components of said video signal with respect to magnitude of low-frequency components thereof, said deemphasis means being complementary with said preemphasis means in their modification characteristics; identification signal detecting means for detecting said record start identification signal from said recording medium and for generating an identification detecting signal; and second reset means for resetting said deemphasis means in response to said identification detecting signal.

Still further, a fourth aspect of the present invention provides a video signal recording and reproducing apparatus for recording and reproducing a video signal onto and from a recording medium comprising: preemphasis means for modifying said video signal prior to recording onto said recording medium, so as to increase magnitude of high-frequency components of said video signal with respect to magnitude of low-frequency components thereof; means for providing a record end signal representing a termination of recording of said video signal; identification signal recording means for generating a record end identification signal in response to said record end signal and for recording said record end identification signal onto a corresponding portion of said recording medium; deemphasis means for modifying said video signal after reproduction from said recording medium, so as to decrease magnitude of high-frequency components of said video signal with respect to magnitude of low-frequency components thereof, said deemphasis means being complementary with said preemphasis means in their modification characteristics; identification signal detecting means for detecting said record end identification signal from said recording medium and for generating an identification detecting signal; and reset means for resetting said deemphasis means in response to said identification detecting signal.

Yet further, a fifth aspect of the present invention provides a video signal reproducing apparatus used for reproducing a video signal recorded in a recording medium, said video signal having been modified in preemphasis means prior to recording onto said recording medium so as to increase magnitude of high-frequency components of said video signal with respect to magnitude of low-frequency components thereof, said recording medium memorizing a record start identification signal representing an initiation of recording of said video signal at a corresponding portion thereof, said preemphasis means being reset in response to the initiation of recording of said video signal, said video signal reproducing apparatus comprising: deemphasis means for modifying said video signal after reproduction from said recording medium, so as to decrease magnitude of high-frequency components of said video signal with respect to magnitude of low-frequency components thereof, said deemphasis means being complementary with said preemphasis means in their modification characteristics; identification signal detecting means for detecting said record start identification signal from said recording medium and for generating an identification detecting signal; and reset means for resetting said deemphasis means in response to said identification detecting signal.

Moreover, a sixth aspect of the present invention provides a video signal reproducing apparatus used for reproducing a video signal recorded in a recording medium, said video signal having been modified in preemphasis means prior to recording onto said recording medium so as to increase magnitude of high-frequency components of said video signal with respect to magnitude of low-frequency components thereof, said recording medium memorizing a record end identification signal representing a termination of recording of said video signal at a corresponding portion thereof, said video signal reproducing apparatus comprising: deemphasis means for modifying said video signal after reproduction from said recording medium, so as to decrease magnitude of high-frequency components of said video signal with respect to magnitude of low-frequency components thereof, said deemphasis means being complementary with said preemphasis means in their modification characteristics; identification signal detecting means for detecting said record end identification signal from said recording medium and for generating an identification detecting signal; and reset means for resetting said deemphasis means in response to said identification detecting signal.

Furthermore, a seventh aspect of the present invention provides a video signal recording and reproducing apparatus for recording and reproducing a video signal onto and from a recording medium comprising: preemphasis means for modifying said video signal prior to recording onto said recording medium, so as to increase magnitude of high-frequency components of said video signal with respect to magnitude of low-frequency components thereof; record signal processing means for receiving said video signal outputted from said preemphasis means and modulating said video signal into an appropriate signal for the recording onto said recording medium; reproduction signal processing means for demodulating said video signal read out from said recording medium; deemphasis means for modifying said video signal to decrease magnitude of high-frequency components of said video signal with respect to magnitude of low-frequency components thereof, said deemphasis means being complementary with said preemphasis means in their modification characteristics; and switching means, operatively connected to said preemphasis means so as to selectively supply a non-circulated video signal newly supplied to said preemphasis means or a circulated video signal fed back from said deemphasis means.

Preferably, in the seventh aspect of the present invention, said recording medium is rewound a predetermined amount from a designated record start timing and, then, starts playback while said switching means is situated to supply said circulated video signal, and further said switching means is changed over to supply said non-circulated video signal when said recording medium reaches said designated record start timing.

The above and other objects, features and advantages of the present invention will become more apparent from the following detailed description which is to be read in conjunction with the accompanying drawings.

BRIEF DESCRIPTION OF THE DRAWINGS

FIGS. 7(A)–7(D) are views showing several examples of the ID signals to be recorded into the magnetic tape;

FIG. 8 is a circuit diagram showing another example of the preemphasis circuit of the present invention;

FIG. 9 is a circuit diagram showing another example of the deemphasis circuit of the present invention;

FIG. 14 is a circuit diagram showing a delay circuit adopted in the second embodiment;

FIGS. 15(A)–15(C) are views showing an operation of the second embodiment;

FIG. 18 is a schematic block diagram showing a fourth embodiment of the present invention;

FIG. 19 is a circuit block diagram illustrating a preemphasis/deemphasis circuit of the fourth embodiment;

FIGS. 25(A)–25(D) and 26 are views illustrating an operation of conventional assemble mode electronic editing.

DETAILED DESCRIPTION OF THE PREFERRED EMBODIMENTS

Hereinafter, with reference to accompanying drawings, preferred embodiments of the present invention will be explained in detail.

FIRST EMBODIMENT

Figure 1:
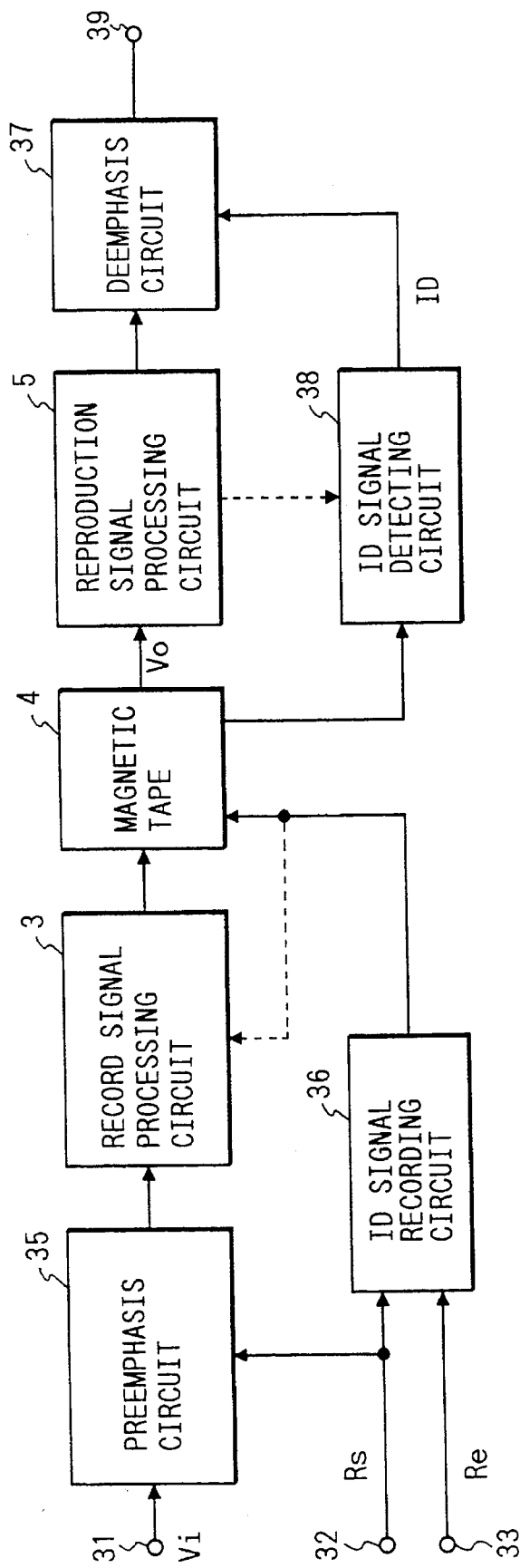
FIG. 1 is a schematic block diagram showing a first embodiment of the present invention.

FIG. 1 is a schematic block diagram showing a first embodiment of the present invention. The same components identical with those of FIGS. 20–24 are designated by the same reference numerals and will be no more explained in detail. In the drawing, a reference numeral 31 represents an input terminal through which video signals Vi to be recorded are inputted. Reference numerals 32 and 33 represent terminals through which a record start signal Rs and a record end signal Re are inputted, respectively.

A reference numeral 35 represents a preemphasis circuit which performs the preemphasis process wherein the magnitude of high frequency components is increased with respect to the magnitude of low frequency components on time base so as to reduce the effects of noise introduced in the system. This preemphasis circuit 35 receives the record start signal Rs supplied from the terminal 32 and resets the preemphasis process in response to this record start signal Rs. Otherwise, the preemphasis circuit 35 continues the preemphasis process.

The preemphasis circuit 35 is operatively connected with subsequent components such as a record signal processing circuit 3 and a magnetic tape 4. A reference numeral 36 represents an ID (i.e. identification) signal recording circuit, which receives the record start signal Rs and record end signal Re supplied from the terminals 32, 33. This ID signal recording circuit 36 generates a record start ID (i.e. identification) signal in response to the record start signal Rs and, in the same way, generates a record end ID (i.e. identification) signal in response to the record end signal Re. The ID signal recording circuit 36 magnetically records these record start ID signal and record end ID signals onto the magnetic tape 4.

A reference numeral 38 represents an ID (i.e. identification) signal detecting circuit, which detects the record start ID signal and record end ID signals from the magnetic tape 4. A reference numeral 37 represents a deemphasis circuit which performs the deemphasis process wherein the magnitude of high frequency components is reduced with respect to the magnitude of low frequency components on time base in a complementary manner. Namely, the preemphasis circuit 35 and the deemphasis circuit 37 are complementary with each other in their modification characteristics.

This deemphasis circuit 37 receives an output signal, i.e. an ID detecting signal, from the ID signal detecting circuit 38 and resets the deemphasis process in response to this ID detecting signal. Otherwise, the deemphasis circuit 37 continues the deemphasis process. A terminal 39 is an output terminal through which the reproduced video signals are outputted.

When the record start signal Rs of HIGH-level is inputted into the preemphasis circuit 35, the preemphasis circuit 35 interrupts the feedback loop constituted therein and stops the preemphasis process. Therefore, video signals Vi are directly outputted without any modification through the preemphasis circuit 35 when the record start signal Rs is HIGH-level. If the record start signal Rs turns to LOW-level, the preemphasis circuit 35 resumes the ordinary preemphasis process.

In the same way, when the ID detecting signal of HIGH-level is inputted into the deemphasis circuit 37, the deemphasis circuit 37 interrupts the feedback loop constituted therein and stops the deemphasis process. Therefore, video signals Vo are directly outputted without any modification through the deemphasis circuit 37 when the ID detecting signal is HIGH-level. If the ID detecting signal turns to LOW-level, the deemphasis circuit 37 resumes the ordinary deemphasis process.

Figure 2:
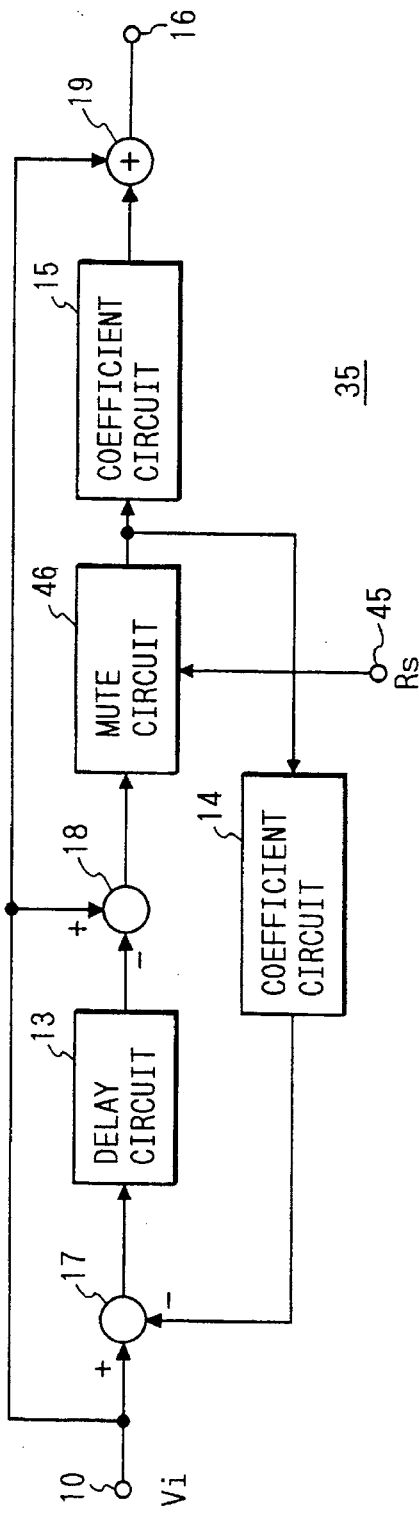
FIG. 2 is a circuit diagram showing a circuit configuration of the preemphasis circuit of the present invention.

FIG. 2 is a circuit configuration of the preemphasis circuit 35. The same components identical with those of FIGS. 20–24 are designated by the same reference numerals and will be no more explained in detail.

An input video signal Vi arriving an input terminal 10 is supplied to subtracter circuits 17, 18, and an adder circuit 19. An output signal of the subtracter circuit 17 is supplied to a delay circuit 13 wherein the signal is delayed a predetermined amount. An output signal of the delay circuit 13 is, then, supplied to the subtracter 18. The subtracter circuit 18 subtracts thus delayed signal from a newly arriving video signal Vi.

An output signal of the subtracter 18 is, in turn, supplied to a mute circuit 46. The mute circuit 46 receives the record start signal Rs from a terminal 45. The mute circuit 46 mutes the signal when the record start signal Rs is HIGH-level. In this instance, a coefficient circuit 15 generates no output. Thus, an output of the adder circuit 19 becomes substantially identical with the input video signal Vi supplied directly from the input terminal 10. On the contrary, when the record start signal Rs is LOW-level, the output of the subtracter circuit 18 is supplied to the coefficient circuits 14, 15 without being muted in the mute circuit 46. An output signal of the coefficient circuit 14 is supplied to the subtracter 17 and subtracted from the newly arriving input video signal Vi therein and, thereafter, supplied again to the delay circuit 13. An output signal of the coefficient circuit 15 is supplied to the adder circuit 19 and added to the newly arriving video signal Vi therein. As a result, the video signal Vi is modified to enhance the magnitude of high frequency components with respect to the magnitude of low frequency components on time base. This preemphasized signal is outputted from a terminal 16.

Figure 3:
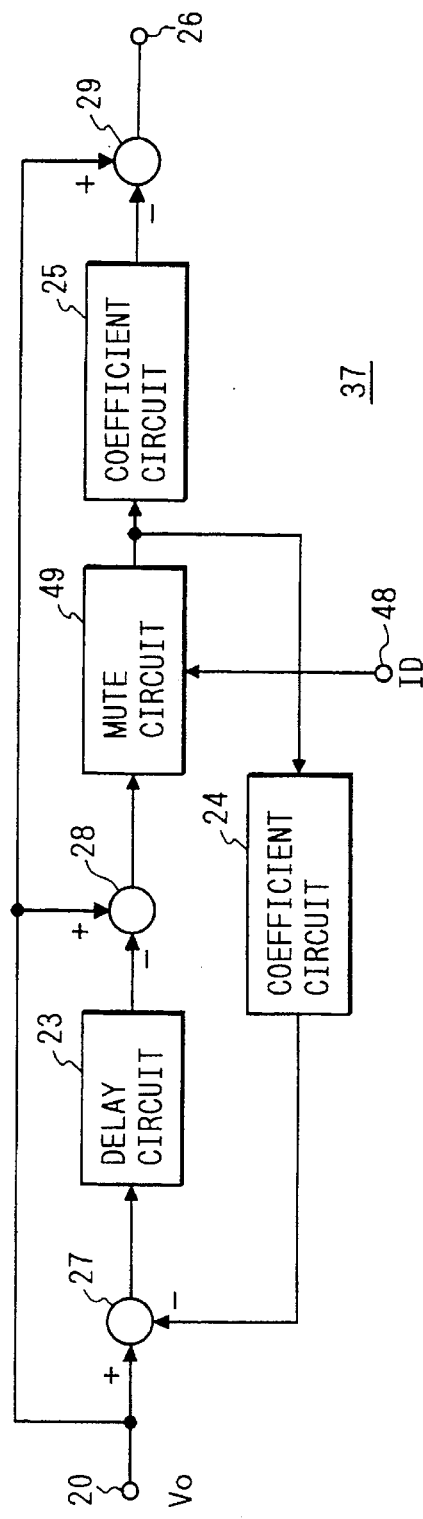
FIG. 3 is a circuit diagram showing a circuit configuration of the deemphasis circuit of the present invention.

FIG. 3 shows a circuit configuration of the deemphasis circuit 37. The output video signal Vo, supplied from the reproduction signal processing circuit 5 preceding the deemphasis circuit 37, is taken in through an input terminal 20. The output video signal Vo, having the preemphasis characteristic, is supplied to subtracters 27, 28, and 29. An output signal of the subtracter 27 is supplied to a delay circuit 23 wherein the signal is delayed a predetermined amount. An output signal of the delay circuit 23 is, then, supplied to the subtracter 28. The subtracter circuit 28 subtracts thus delayed signal from a newly arriving output video signal Vo.

An output signal of the subtracter 28 is, in turn, supplied to a mute circuit 49. The mute circuit 49 receives the ID detection signal ID from a terminal 48. The mute circuit 49 mutes the signal when the ID detection signal ID is HIGH-level. In this instance, a coefficient circuit 25 generates no output. Thus, an output of the subtracter circuit 29 becomes substantially identical with the output video signal Vo supplied directly from the input terminal 20. On the contrary, when the ID detecting signal ID is LOW-level, the output of the subtracter circuit 28 is supplied to the coefficient circuits 24, 25 without being muted in the mute circuit 49. An output signal of the coefficient circuit 24 is supplied to the subtracter 27 and subtracted from the newly arriving output video signal Vo therein and, thereafter, supplied again to the delay circuit 23. An output signal of the coefficient circuit 25 is supplied to the subtracter circuit 29 and subtracted from the newly arriving video signal Vo therein. As a result, the video signal Vo is modified to decrease the magnitude of high frequency components with respect to the magnitude of low frequency components on time base. This deemphasized signal is outputted from a terminal 26.

The modification characteristic of the deemphasis circuit 37 and that of the preemphasis circuit 35 are complementary with each other. Therefore, the video signal Vo obtained from the terminal 26 is a signal having a waveform substantially identical with the input video signal Vi arriving the input terminal 10 of the preemphasis circuit 35.

Figure 4:
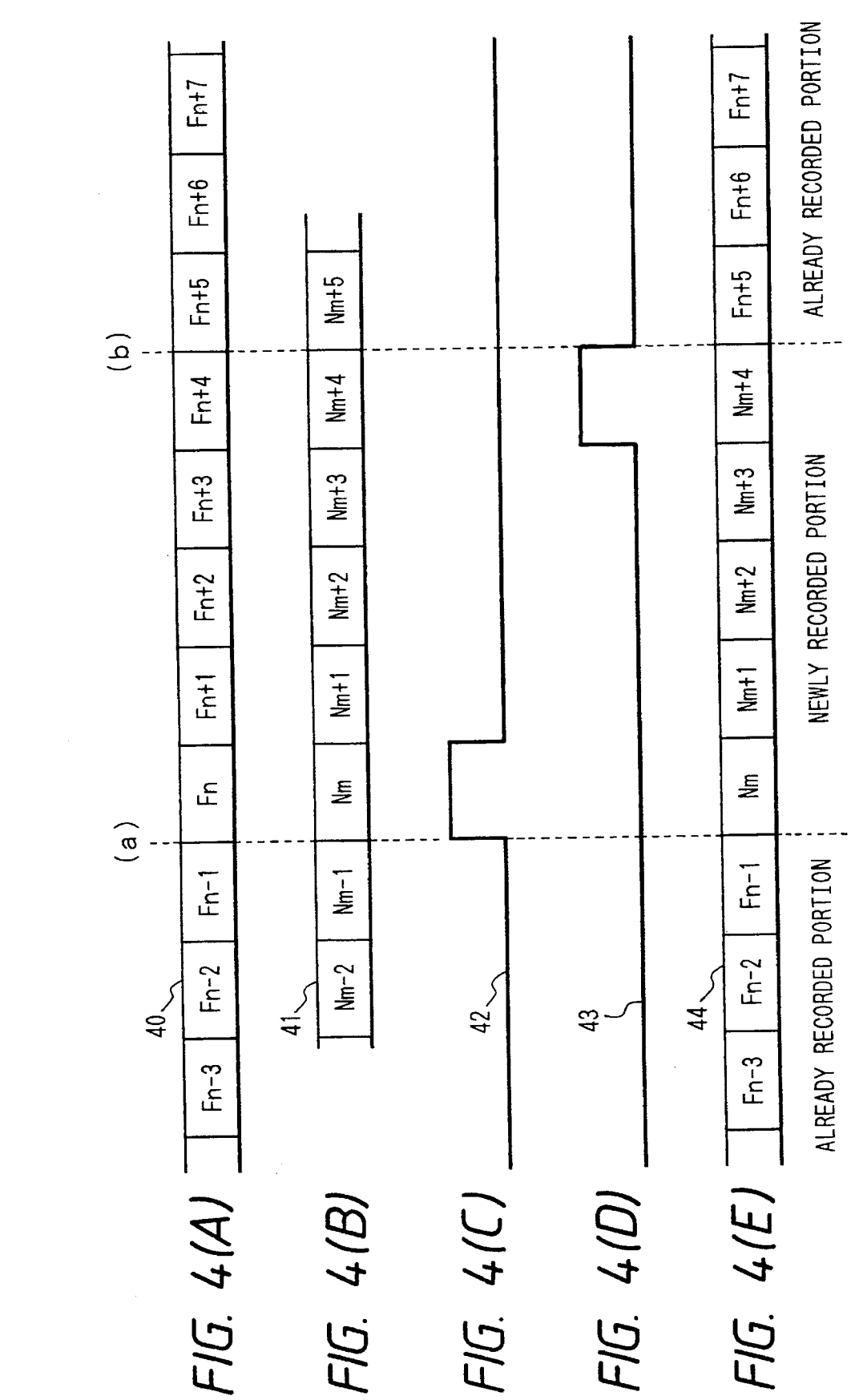
FIGS. 4(A)–4(E) are views illustrating an operation of the first embodiment.

FIGS. 4(A)–4(E) are views illustrating an operation of the first embodiment. Let us suppose that the magnetic tape 4 already memorizes video signals 40 therein as shown in FIG. 4(A). And, these video signals 40 have been applied the preemphasis process. FIG. 4(B) shows video signals 41 which are to be newly recorded on the magnetic tape 4. If the recording starts from a frame Nm, a timing (a) is designated as a record start timing. Accordingly, the record start signal Rs is turned to HIGH-level during, for example, one frame period from the timing (a) as shown by a line 42 of FIG. 4(C).

If the record start signal Rs is turned to HIGH-level, the mute circuit 46 of the preemphasis circuit 35 responds to this record start signal Rs to temporarily interrupt the feedback loop of the coefficient circuit 14. The input video signal Vi arriving the input terminal 10 is directly taken out from the output terminal 16 via the adder circuit 19.

Therefore, the preemphasis circuit 35 can exclude the influence of preceding frames Nm–1, Nm–2, . . . before the timing (a). In other words, the preemphasis circuit 35 temporarily interrupts the preemphasis process in response to the record start signal Rs.

When the preemphasis circuit 35 is reset, the ID signal recording circuit 36 generates a record start ID signal in response to the record start signal Rs (i.e. 42 of FIG. 4(C)). This record start ID signal is memorized in a vertical blanking period in connection with the frame Nm of the video signal 41.

Next, if the recording ends at a frame Nm+4, a timing (b) is designated as a record end timing. Accordingly, the record end signal Re is turned to HIGH-level during, for example, one frame period immediately before the timing (a) as shown by a line 43 of FIG. 4(D). At the same time, the ID signal recording circuit 36 generates a record end ID signal in response to the record end signal Re (i.e. 43 of FIG. 4(D)). This record end ID signal is memorized in a vertical blanking period in connection with the frame Nm+4 of the video signal 41.

As a result, a newly recorded portion, Nm to Nm+4, are overlapped onto the already recorded portion on the magnetic tape 4 in a region between the timings (a) and (b). Thus, assembled video images 44 are finally obtained as shown in FIG. 4(E).

Next, playback of thus recorded magnetic tape will be explained below. In the playback of the magnetic tape 4 memorizing the assembled video signals 44, the deemphasis circuit 37 applies the deemphasis process to the video signals 44. The deemphasis process is complementary with the preemphasis process of the preemphasis circuit 35. The deemphasis circuit 37 is reset during a period of time when the ID detecting signal of the ID detecting circuit 38 is HIGH-level.

Namely, if the ID signal detecting circuit 38 detects the record start ID signal during the playback of the magnetic tape 4, the ID signal detecting circuit 38 generates a HIGH-level signal during a period of time corresponding to the frame Nm. Furthermore, if the ID signal detecting circuit 38 detects the record end ID signal during the playback of the magnetic tape 4, the ID signal detecting circuit 38 generates a HIGH-level signal during a period of time corresponding to the frame Nm+4.

As described above, in the deemphasis process applied to the assembled video signals 44 after the timing (a), the deemphasis circuit 37 is free from the adverse influence from the frames Fn–1, Fn–2, Fn–3, . . . which are not used in the preemphasis process. Therefore, no residual image or adverse effect is caused.

In the same way, in the deemphasis process applied to the assembled video signals 44 after the timing (b), the deemphasis circuit 37 is free from the adverse influence from the frames Nm+4, Nm+3, Nm+2, . . . which are not used in the preemphasis process. Therefore, no residual image or adverse effect is caused.

Although the above-described embodiment specifies the reset period of one frame length to each of the preemphasis circuit 35 and the deemphasis circuit 37, it will be preferable to set the length of this reset period to be identical with the delay time of the delay circuit 13 or 23 or its multiple. Still further, it would be preferable to synchronize the reset timing with the frame or field of the video signals.

It will be no problem even if the recorded portion of the video signals 41 ends at a timing between the frame Nm and the frame Nm+4 and therefore no video signal is recorded after this timing. It will be also no problem even if the recorded portion of the video signals 41 starts at a timing between the frame Nm and the frame Nm+4 and therefore no video signal is recorded before this timing.

Next, detailed circuit configurations of the ID signal recording circuit 36 and the ID signal detecting circuit 38 will be explained with reference to FIGS. 5–7.

Figure 5:
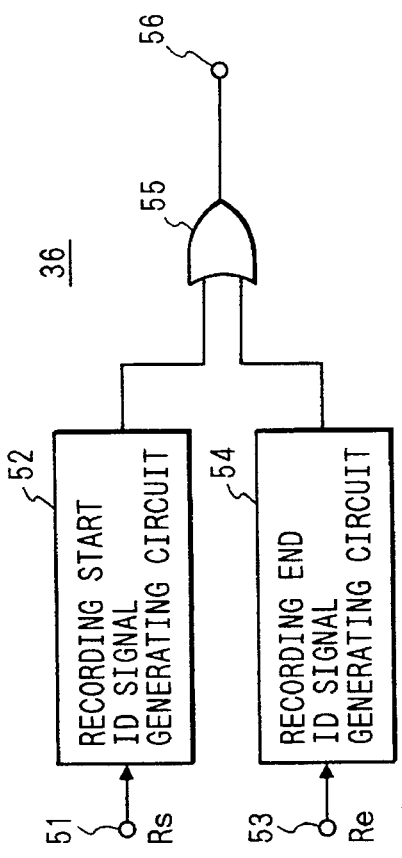
FIG. 5 is a circuit diagram showing a circuit configuration of the ID signal recording circuit.

FIG. 5 shows the ID signal recording circuit 36. The record start signal Rs, inputted from a terminal 51, is supplied into a recording start ID signal generating circuit 52. The recording start ID signal generating circuit 52 generates the record start ID signal. The record end signal Re, inputted from a terminal 53, is supplied into a recording end ID signal generating circuit 54. The recording end ID signal generating circuit 54 generates the record end ID signal. Thereafter, the record start ID signal and the record end ID signal are both supplied into an OR circuit 55, whose output signal is taken out from a terminal 56 and recorded into the magnetic tape 4.

Figure 6:
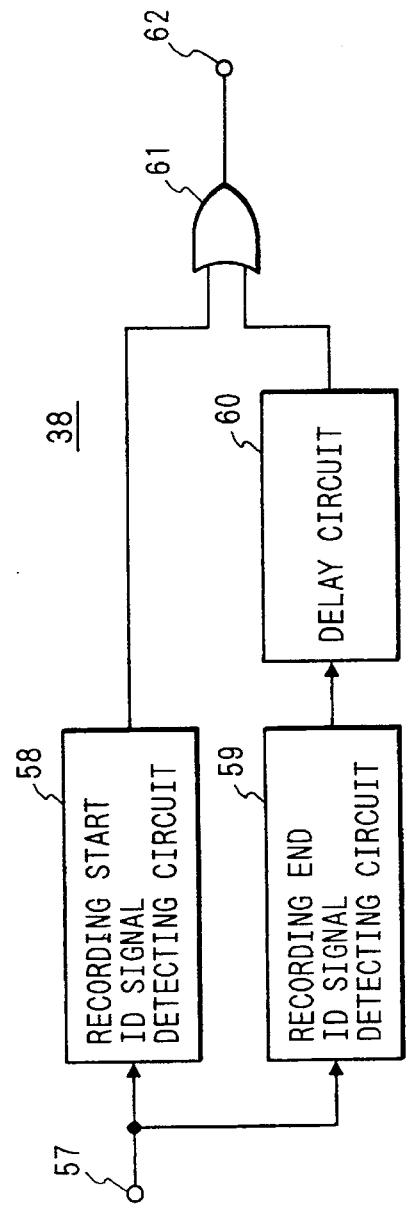
FIG. 6 is a circuit diagram showing a circuit configuration of the ID signal detecting circuit.

FIG. 6 shows the ID signal detecting circuit 38. The record start or end ID signal, read out from the magnetic tape 4, is supplied to both a recording start ID signal detecting circuit 58 and a recording end ID signal detecting circuit 59. If the recording start ID signal detecting circuit 58 detects the record start ID signal, the recording start ID signal detecting circuit 58 generates the ID detecting signal. This ID detecting signal becomes HIGH-level during a period of time equivalent to the corresponding frame of video signals.

If the recording end ID signal detecting circuit 59 detects the record end ID signal, the recording end ID signal detecting circuit 59 also generates the ID detecting signal. This ID detecting signal becomes HIGH-level during a period of time equivalent to the corresponding frame of video signals. The ID detecting signal is thereafter delayed in a delay circuit 60 by one frame period. Both outputs from the recording start ID signal detecting circuit 58 and the delay circuit 60 are supplied to an OR circuit 61. An output of the OR circuit 61 is taken out from a terminal 62 and then supplied to the terminal 48 of the deemphasis circuit 37 so as to reset the deemphasis circuit 37.

With reference to FIGS. 7(A)–7(B), several examples of the ID signals to be recorded into the magnetic tape 4 will be explained below. The ID signal generated from the ID signal recording circuit 36 is, first of all, supplied to the record signal processing circuit 3 via a dotted line of FIG. 1. The ID signal is recorded into a predetermined horizontal period of the vertical blanking period of the video signal to be recorded in a multiple manner.

FIG. 7(A) shows a part of the vertical blanking period of the video signal 80 which is not recorded the ID signal. FIG. 7(B) shows one example of the ID signal multiplied with the video signal 80 of FIG. 7(A). The ID signal 81 has a level of 25% (25IRE) when a white peak level of the image signal is 100%. FIG. 7(D) shows another example of the ID signal 83 which has a level of 75% (75IRE). Furthermore, FIG. 7(C) shows the ID signal 82 which has a level of 50% (50IRE), which may be used for the indication of emphasis being applied on time base.

In the playback of the magnetic tape 4 having memorized the ID signal, the reproduction signal processing circuit 5 of FIG. 1 sends the video signal to the ID signal detecting circuit 38. The ID signal detecting circuit 38 discriminates the level of the signal multiplied in the horizontal period of the vertical blanking period in order to detect the record start ID signal or the record end ID signal.

Various methods can be used to record the ID signals. For example, a user bit of the VITC signal multiplied in the vertical blanking period of the video signals can be assigned to the record start ID signal or the record end ID signal. The ID signal can be also recorded in a video track by frequency multiplying it with the video signal having been modified for recording. The ID signal can be further recorded in the control track or other tracks besides the recording track of image signals.

A detailed example of the ID signal, recorded together with data necessary for the record/reproduction apparatus, is described below. Data is generally expressed by the use of a predetermined period of Y signal in the data line. A typical construction of the data is, for example, as follows:

TABLE 1

| 8 bit | 8 bit | 56 bit | 32 bit | 16 bit | 8 bit |
|-------|-------|--------|-----------|--------|-------|
| pre   | sync  | data   | time code | ecc    | LR    |

Details of signal names and their contents are as follows:

TABLE 2

| signal name | signal content |
|---|---|
| pre | pre amble | NRZ "10101010" |
| sync | synchronization pattern | NRZ "11101101" |
| data | data | NRZ modulation |
| timecode | timecode | NRZ modulation |
| ecc | error correcting code | NRZ modulation |
| LR | level reference | 50IRE (fixed value) |

NRZ modulated data are FM modulated together with video signals. The record start ID signal and the record end ID signal can be memorized, for example, in a form of two bits, as shown in the following table 3.

TABLE 3

| "00" | No emphasis recording |
| "01" | Record end ID |
| "10" | Record start ID |
| "11" | With emphasis recording |

Next, other embodiments of the preemphasis circuit 35 and the deemphasis circuit 37 will be explained with reference to FIGS. 8 and 9. The same components identical with those of previous examples are designated by the same reference numerals and will be no more explained in detail. FIG. 8 shows another example of the preemphasis circuit 35. In the drawing, the mute circuit 46 is interposed between the delay circuit 13 and the coefficient circuit 15. If the record start signal Rs supplied from the terminal 45 is HIGH-level, the mute circuit 46 mutes an output of the delay circuit 13 so as not being supplied to the coefficient circuits 14, 15. An output of the coefficient circuit 14 is supplied to the adder circuit 11 in which this output signal is added with the input video signal Vi supplied from the terminal 10. An output signal of the adder 11 is supplied to the delay circuit 13 to constitute the feedback loop. Meanwhile, an output of the coefficient circuit 15 is supplied to the subtracter 12, in which this output is subtracted from the input video signal Vi. Then, an output signal of the subtracter 12 is taken out from the terminal 16. This preemphasis circuit 35 functions in the same manner as that of FIG. 2.

FIG. 9 shows another example of the deemphasis circuit 37. In the drawing, the mute circuit 49 is interposed between the delay circuit 23 and the coefficient circuit 25. If the ID detecting signal supplied from the terminal 48 is HIGH-level, the mute circuit 49 mutes an output of the delay circuit 23 so as not being supplied to the coefficient circuits 24, 25. An output of the coefficient circuit 24 is supplied to the adder circuit 21 in which this output signal is added with the output video signal Vo supplied from the terminal 20. An output signal of the adder 21 is supplied to the delay circuit 23 to constitute the feedback loop. Meanwhile, an output of the coefficient circuit 25 is supplied to the adder 22, in which this output is added with the output video signal Vo. Then, an output signal of the adder 22 is taken out from the terminal 26. This deemphasis circuit 35 functions in the same manner as that of FIG. 3.

Moreover, still another embodiments of the preemphasis circuit 35 and the deemphasis circuit 37 will be explained below with reference to FIGS. 10 and 11.

Figure 10:
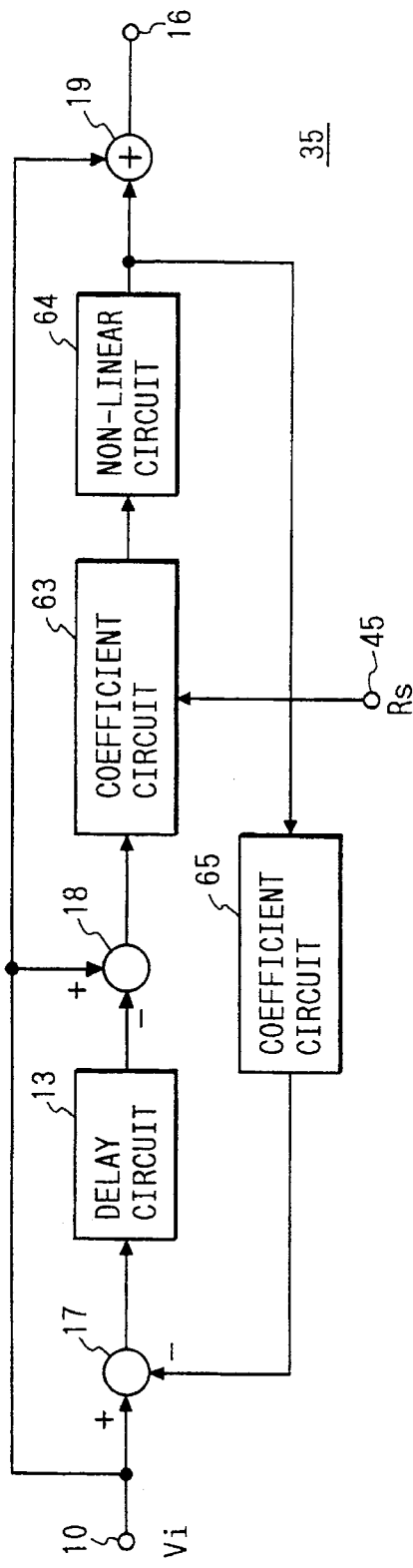
FIG. 10 is a circuit diagram showing still another example of the preemphasis circuit of the present invention.

FIG. 10 shows still another embodiment of the preemphasis circuit 35. An output of the subtracter circuit 18 is supplied through a coefficient circuit 63 to a non-linear circuit 64. An output signal of the non-linear circuit 64 is on one hand supplied to the adder 19 and is on the other hand supplied to a coefficient circuit 65. An output of the coefficient circuit 65 is fed back to the subtracter 17 so as to constitute the feedback loop.

The coefficient circuit 63 basically multiplies a predetermined coefficient other than "0" with the output of the subtracter 18. If the coefficient circuit 63 receives a HIGH-level record start signal Rs from the terminal 45, the coefficient circuit 63 varies its coefficient to be "0". That is, the coefficient circuit 63 has a function equivalent to the mute circuit 46 and the coefficient circuit 15 of FIG. 2.

The non-linear circuit 64 is a limiter which suppresses an amplitude of the signal inputted therein within a predetermined value if the amplitude of the signal is larger than the predetermined value. Accordingly, this preemphasis circuit 35 changes the preemphasis amount in accordance with the video signal inputted from the terminal 10. This preemphasis amount has a non-liner characteristic, wherein the smaller the amplitude of the video signal is, the larger the preemphasis amount becomes.

Figure 11:
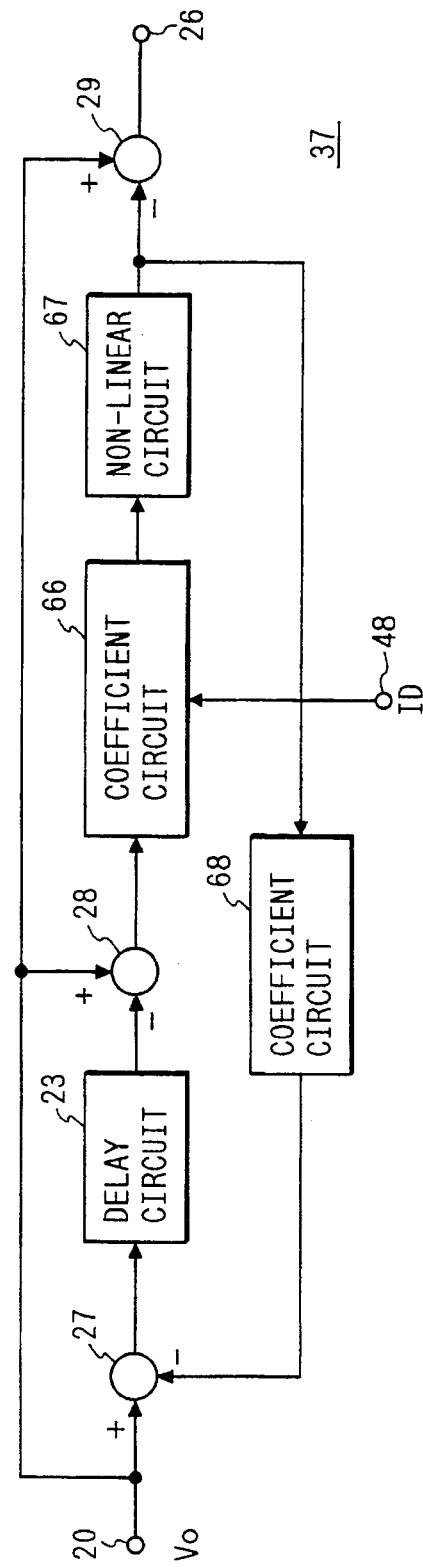
FIG. 11 is a circuit diagram showing still another example of the deemphasis circuit of the present invention.

FIG. 11 shows still another embodiment of the deemphasis circuit 37. An output of the subtracter circuit 28 is supplied through a coefficient circuit 66 to a non-linear circuit 67. An output signal of the non-linear circuit 67 is on one hand supplied to the subtracter 29 and is on the other hand supplied to a coefficient circuit 68. An output of the coefficient circuit 68 is fed back to the subtracter 27 so as to constitute the feedback loop.

The coefficient circuit 66 basically multiplies a predetermined coefficient other than "0" with the output of the subtracter 28. If the coefficient circuit 66 receives a HIGH-level ID detecting from the terminal 48, the coefficient circuit 66 varies its coefficient to be "0". That is, the coefficient circuit 66 has a function equivalent to the mute circuit 49 and the coefficient circuit 25 of FIG. 3.

The non-linear circuit 67 has substantially the same function as the non-linear circuit 64 of FIG. 10. Accordingly, this deemphasis circuit 37 changes the deemphasis amount in accordance with the video signal inputted from the terminal 20. This deemphasis amount has a non-liner characteristic, wherein the smaller the amplitude of the video signal is, the larger the preemphasis amount becomes.

Using the preemphasis circuit 35 of FIG. 10 and the deemphasis circuit 37 of FIG. 11, both having non-linear emphasis characteristics, is advantageous in suppressing overshoot occurring when the images on the screen move fast or the screen itself is switched to another. Accordingly, it becomes possible to avoid distortion of video images.

SECOND EMBODIMENT

Figure 12:
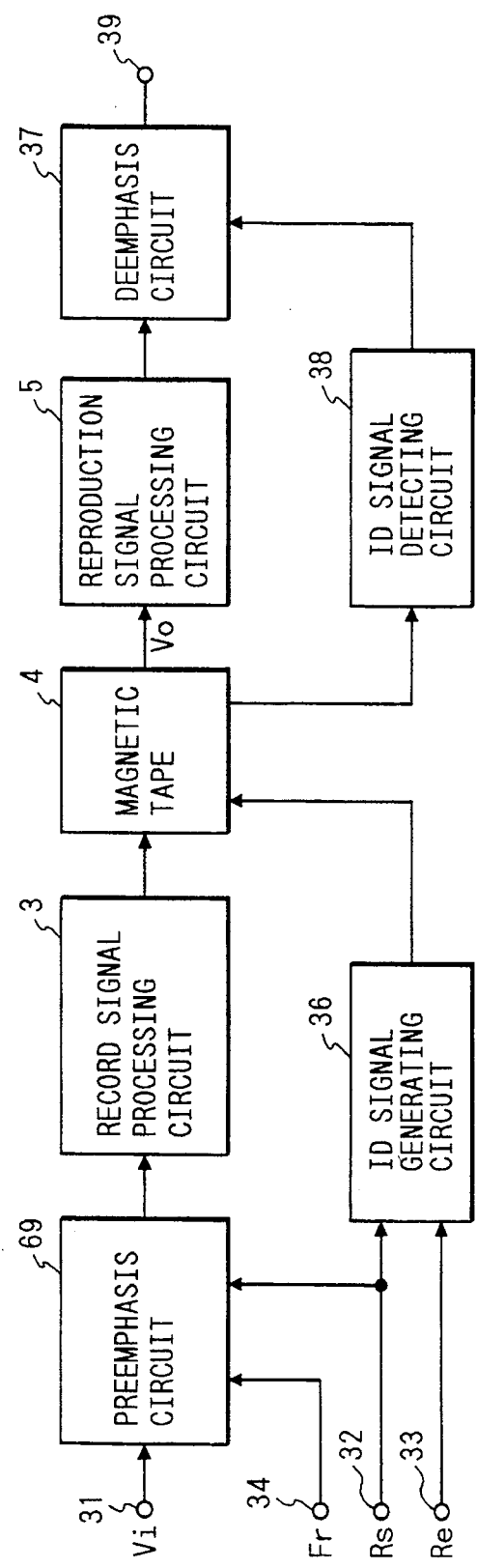
FIG. 12 is a schematic block diagram showing a second embodiment of the present invention.
Figure 13:
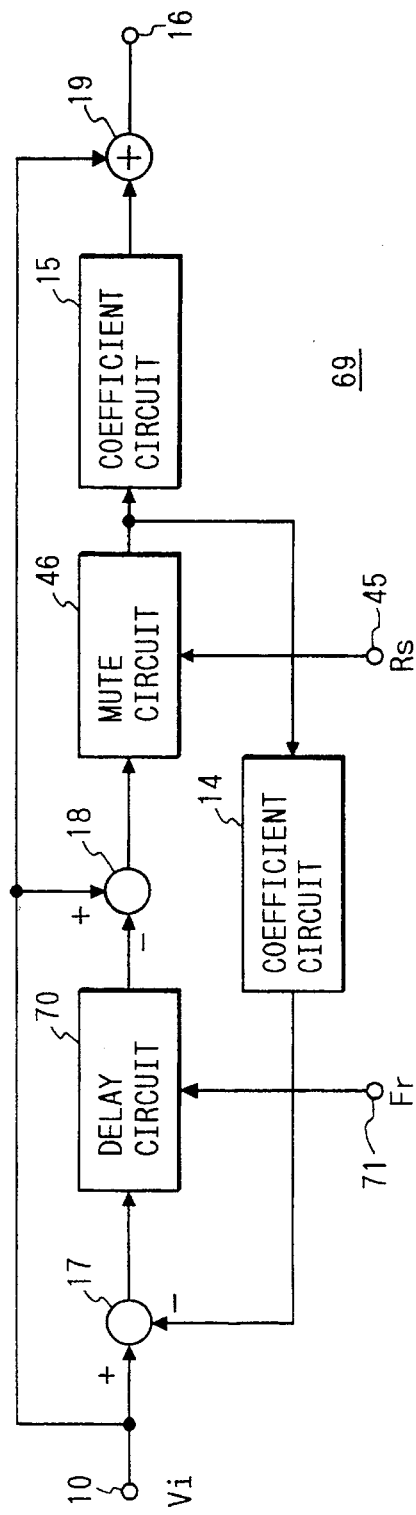
FIG. 13 is a circuit diagram showing a circuit configuration of the preemphasis circuit of the second embodiment.
Figure 16:
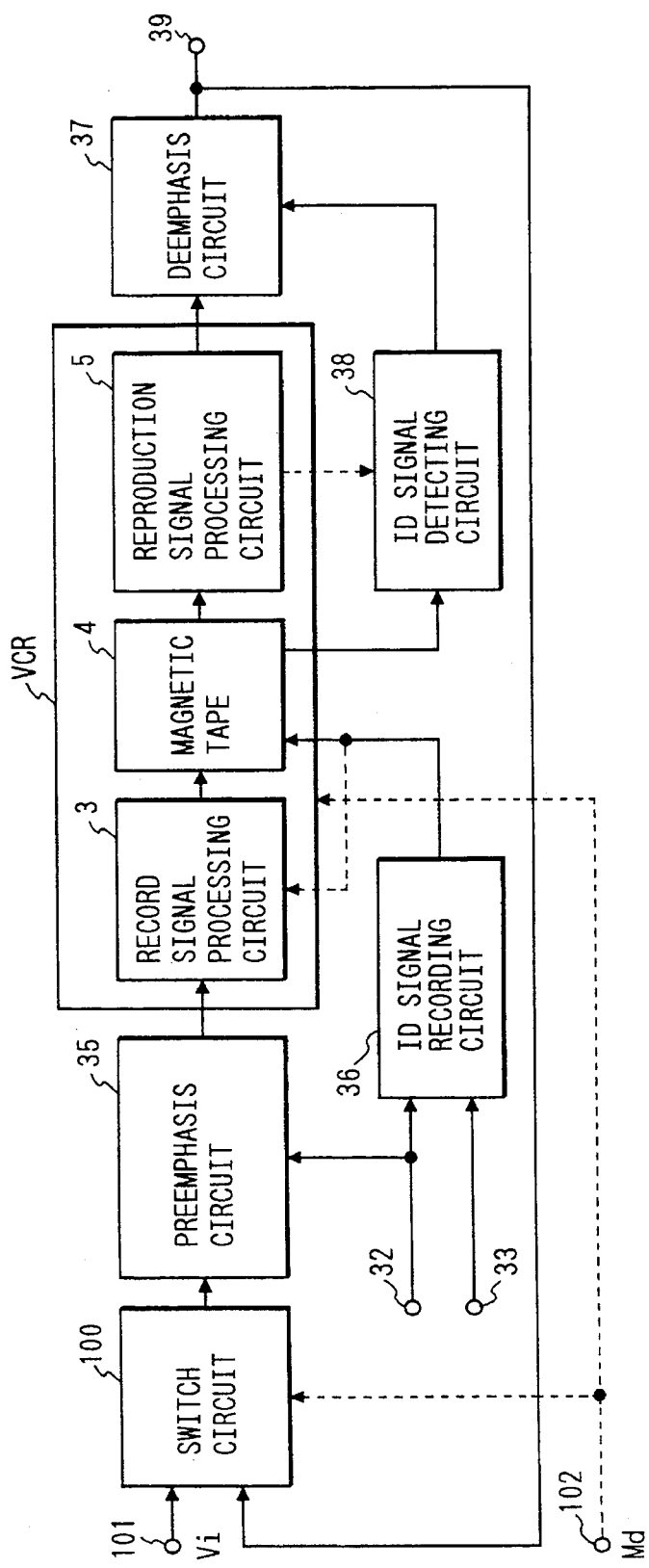
FIG. 16 is a schematic block diagram showing a third embodiment of the present invention.

A second embodiment of the present invention will be explained with reference to FIGS. 12–15. FIG. 12 is a schematic block diagram showing the second embodiment of the present invention. FIG. 13 is a circuit diagram showing a preemphasis circuit 69 of FIG. 12. FIG. 14 is a circuit diagram showing a delay circuit 70 of FIG. 13. FIGS. 15(A)–15(C) show an operation of the second embodiment. The same components identical with those of previous examples are designated by the same reference numerals and will be no more explained in detail.

In FIG. 12, a freeze signal Fr is inputted from a terminal 34. The freeze signal is turned to HIGH-level in response to a record pause switch (not shown) provided in VCR, which an operator operates to temporarily interrupt recording. It will be preferable to synchronize the turning on-and-off of the freeze signal Fr with the frame interval of the video signals. The freeze signal Fr is supplied to a preemphasis circuit 69.

FIG. 13 shows a detailed circuit configuration of the preemphasis circuit 69. This preemphasis circuit 69 is different from the preemphasis circuit 35 of FIG. 2 in that the freeze signal FF is supplied from a terminal 71 to a delay circuit 70. When the freeze signal Fr is HIGH-level, the delay circuit 70 memorizes the video signal of one frame inputted therein immediately before. Other feature of this preemphasis circuit 69 is identical with the preemphasis circuit 35 of FIG. 2. The delay circuit 70 may be replaced by the delay circuit 13 shown in FIGS. 8, 10. If the record pause switch (not shown) is operated, the HIGH-level freeze signal Fr is supplied to the terminal 34 of FIG. 12, i.e. the terminal 71 of FIG. 13.

FIG. 14 shows a circuit configuration of the delay circuit 70. A terminal 72 is supplied with an output signal from the subtracter circuit 17. This signal is then supplied into a terminal A of a signal select circuit 73. The signal select circuit 73 is operative to select either input of terminals A and B. When the signal select circuit 73 receives a LOW-level freeze signal Fr from the terminal 71, it selects the input of the terminal A. An output of the signal select circuit 73 is supplied to a frame memory 74 of an FIFO (first-in first-out) type. This frame memory 74 delays the signal inputted therein by one frame period. An output signal of the frame memory 74 is on one hand fed back to the terminal B of the signal select circuit 73 and on the other hand supplied to a terminal 75. An output signal taken out from the terminal 75 is supplied to the subtracter circuit 18 of FIG. 13.

If the freeze signal FF is turned to HIGH-level, the signal select circuit 73 selects an input of the terminal B and supplies it to the frame memory 74. Accordingly, the signal of one frame period inputted immediately before is again supplied to the frame memory 74 when the freeze signal Fr is HIGH-level.

An operation of the second embodiment will be explained with reference to FIGS. 15(A)–15(C). Let us suppose that there are video signals 76 memorized as shown in FIG. 15(A). The record pause switch is depressed during a period of time between a timing (c) which is immediately after a frame An−1 and a timing (d) which is immediately before a frame Bm, as shown in FIG. 15(B). In this case, the preemphasis circuit 69 of FIG. 13 executes an ordinary preemphasis process wherein the magnitude of high frequency components is enhanced on time base till the timing (c). Then, during a period from the timing (c) to the timing (d), the delay circuit 70 holds the content obtained at the timing (c). After the timing (d), the preemphasis circuit 69 executes the preemphasis process with respect to the frames Bm and other frames succeeding it on the basis of the video signals of frame An−1 and other frames preceding it. As a result, the magnetic tape 4 memorizes video signals newly edited, as shown in FIG. 7 (C).

In the playback of thus memorized magnetic tape 4, the deemphasis circuit 37 carries out the ordinary deemphasis process. The deemphasis process of the frame Bm, Bm+1, . . . is carried out on the basis of the frames An−1, An−2, . . . Consequently, the preemphasis in the recording and the deemphasis in the playback are complementary with each other. This prevents record pause operation from causing residual images and other adverse effects.

In the delay circuit 70, a RAM (random access memory) can be used as the frame memory. It should be constituted, in this case, to inhibit writing video signals into the RAM only when the freeze signal Fr supplied from the terminal 71 is HIGH-level.

Although above embodiments explain the constitution and operation of the video signal recording/reproducing apparatus being integrated, it is needless to say that the preemphasis circuit 35(69), record signal processing circuit 3, and ID signal recording circuit 36 can constitute one recording apparatus independent from others. On the contrary, the reproduction signal processing circuit 5, deemphasis circuit 37, and ID signal detecting circuit 38 can constitute one reproduction apparatus independent of the former.

THIRD EMBODIMENT

A third embodiment of the present invention will be explained with reference to FIGS. 18 and 17. The same components identical with those of previous examples are designated by the same reference numerals and will be no more explained in detail. FIG. 18 is a schematic block diagram showing the third embodiment of the present invention. In the drawing, a reference numeral 100 represents a switch circuit, which is disposed before the preemphasis circuit 35 to selectively supply the input video signal Vi supplied from an input terminal 101 or the output signal of the deemphasis circuit 37. The switch circuit 100 receives a mode signal Md supplied from an input terminal 102 and switches its input signal between two, i.e. the input video signal Vi and the output signal of the deemphasis circuit 37, in response to the mode signal Md.

An operation of the third embodiment will be explained with reference to FIG. 17. In FIG. 17, a point IN represents a record start point. Let us suppose that the assemble mode electronic editing, having been explained with reference to FIGS. 25 and 28, is now executed in this third embodiment.

Figure 17:
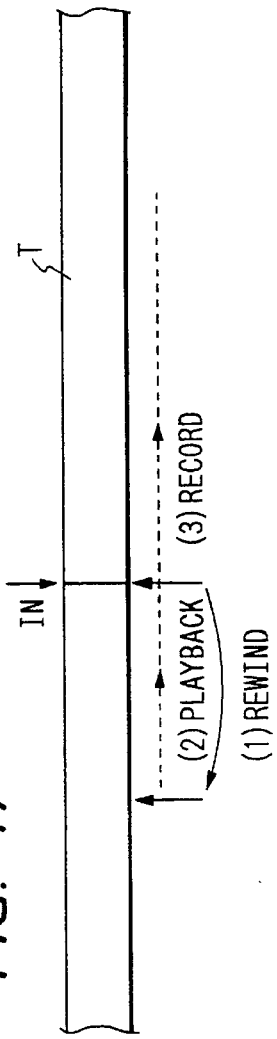
FIG. 17 is a view illustrating an operation of the third embodiment.
Figure 20:
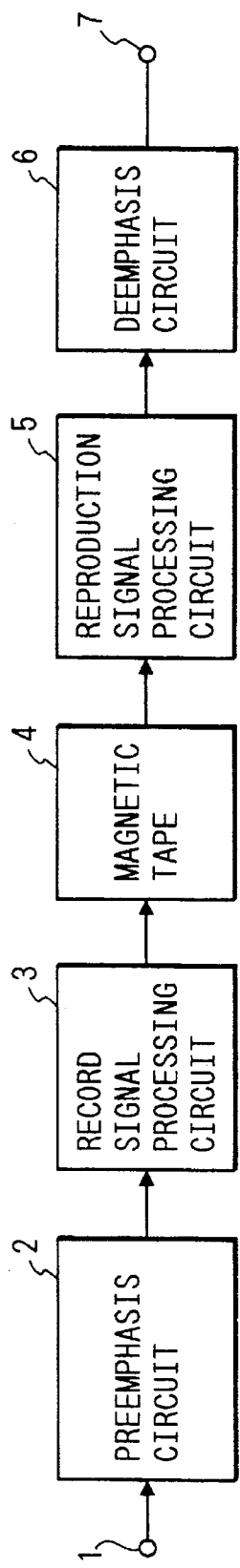
FIG. 20 is a schematic block diagram showing a conventional recording/reproduction apparatus.
Figure 21:
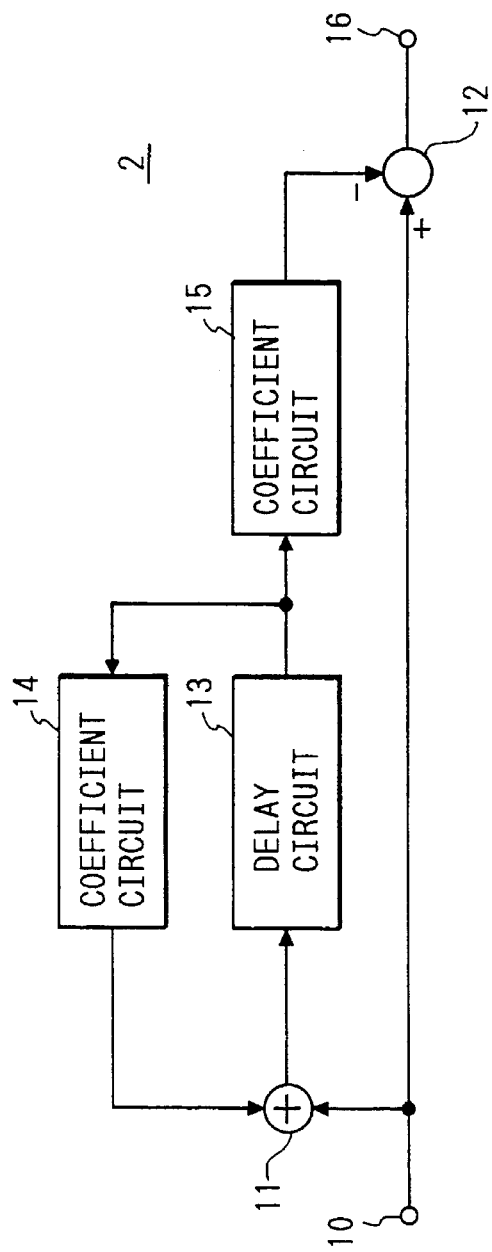
FIG. 21 is a circuit diagram showing a circuit configuration of a conventional preemphasis circuit.
Figure 22:
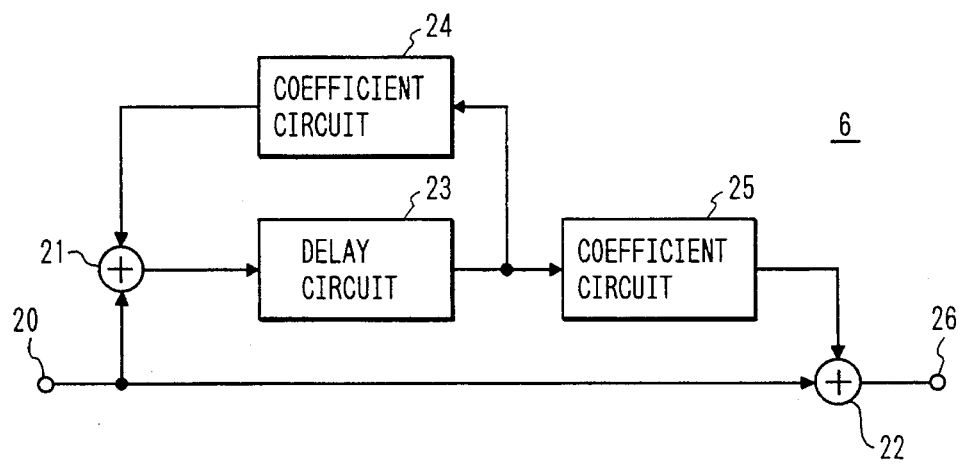
FIG. 22 is a circuit diagram showing a circuit configuration of a conventional deemphasis circuit.
Figure 23:
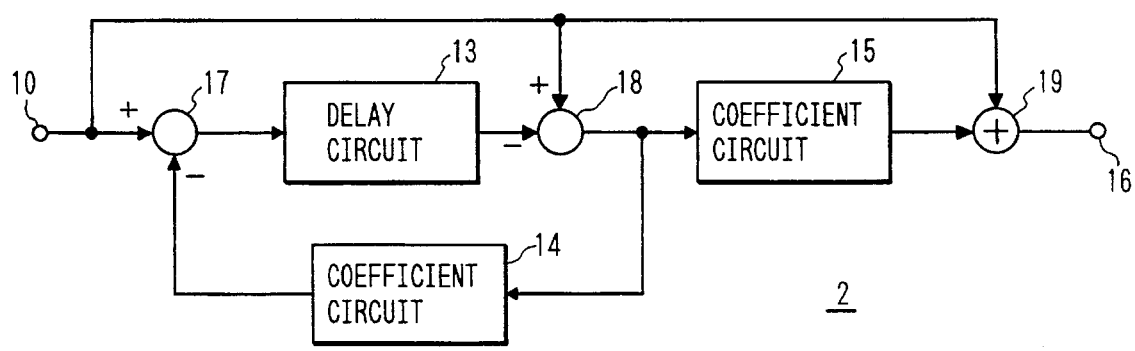
FIG. 23 is a circuit diagram showing a circuit configuration of another conventional preemphasis circuit.
Figure 24:
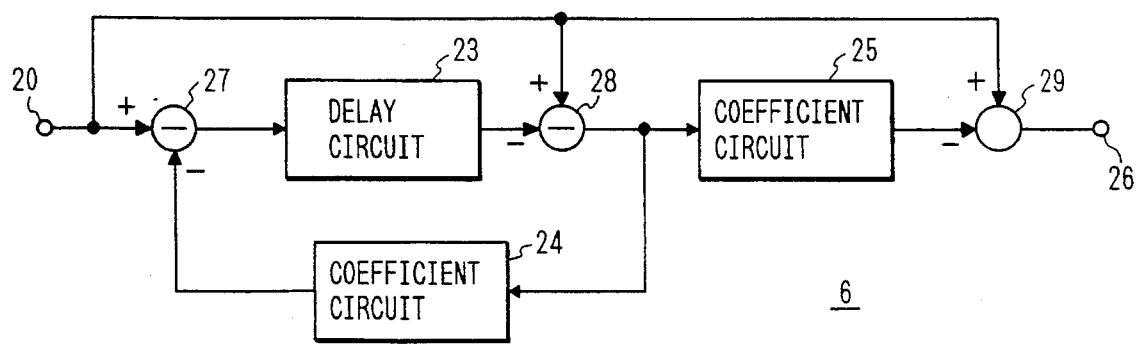
FIG. 24 is a circuit diagram showing a circuit configuration of another conventional deemphasis circuit.

First of all, the tape T is rewound a predetermined amount p, i.e. a pre-roll amount, from the record start point IN, as shown by a solid arrow (1) in FIG. 17. Then, the VCR selects the playback mode and causes the tape T to travel as shown by a dot line (2). The reproduction signal processing circuit 5 reads out video signals recorded onto the tape T. Then, the video signals are applied the deemphasis process in the deemphasis circuit 37. The switch circuit 100 is situated in this instance to select the output signal of the deemphasis circuit 37. therefore, the preemphasis circuit 35 carries out the preemphasis process based on the output signal of the deemphasis circuit 37 in this playback period (2).

If the tape T reaches the record start point IN, the mode signal Md is supplied from the terminal 102 to the switching circuit 100. The switch circuit 100 changes over its input signals to the input video signal Vi newly arriving from the terminal 101. The preemphasis circuit 35 initiates the preemphasis process on the basis of the input video signal Vi. At the same time, the VCR changes its mode to the record mode, as shown by a dot line (3) in FIG. 17 in response to the mode signal Md supplied from the terminal 102. The record signal processing circuit 3 starts processing video signals for recording.

In the reproduction of video signals recorded onto the tape T, the ordinary deemphasis process is carried out.

FOURTH EMBODIMENT

A fourth embodiment of the present invention will be explained with reference to FIGS. 18 and 19. The same components identical with those of previous examples are designated by the same reference numerals and will be no more explained in detail. FIG. 18 is a schematic block diagram showing the fourth embodiment of the present invention. In the drawing, a reference numeral 103 represents a preemphasis/deemphasis circuit. This preemphasis/deemphasis circuit 103 has a function equivalent to both the previous preemphasis 35 and deemphasis circuits 37. The preemphasis/deemphasis circuit 103 is interposed between the switch circuit 100 and the record signal processing circuit 3.

As well as the third embodiment, the fourth embodiment executes the assemble mode electronic editing. An operation of the fourth embodiment is substantially the same as the third embodiment which has been explained with reference to FIG. 17.

By the way, in the playback period (2), the preemphasis/deemphasis circuit 103 becomes substantially equivalent to the deemphasis circuit 103-1 and the preemphasis circuit 103-2 serially disposed in this order, as shown in FIG. 19.

As this invention may be embodied in several forms without departing from the spirit of essential characteristics thereof, the present embodiments are therefore illustrative and not restrictive, since the scope of the invention is defined by the appending claims rather than by the description preceding them, and all changes that fall within meets and bounds of the claims, or equivalence of such meets and bounds are therefore intended to embraced by the claims.

What is claimed is:

1. A video signal recording and reproducing apparatus for recording and reproducing a video signal onto and from a recording medium comprising:

preemphasis means for modifying said video signal prior to recording onto said recording medium, so as to increase magnitude of high-frequency components of said video signal with respect to magnitude of low-frequency components thereof;

record signal processing means for receiving said video signal outputted from said preemphasis means and modulating said video signal into an appropriate signal for the recording onto said recording medium;

reproduction signal processing means for demodulating said video signal read out from said recording medium;

deemphasis means for modifying said video signal outputted from said reproduction signal processing means to decrease magnitude of high-frequency components of said video signal with respect to magnitude of low-frequency components thereof, said deemphasis means being complementary with said preemphasis means in modification characteristics;

switching means, operatively connected to said preemphasis means to selectively supply said preemphasis means with video signal newly supplied from signal input means or said video signal outputted from said deemphasis means; and control means for controlling said video signal recording and reproducing apparatus to execute a playback mode for a predetermined period immediately before starting a recording mode for recording said video signal inputted from said signal input means, while controlling said switch means to select said video signal outputted from said deemphasis means during execution of said playback mode, said control means further controlling said switch means to select said video signal newly supplied from said signal input means upon termination of said predetermined period, wherein said recording medium is rewound a predetermined amount from a designated record start timing when the recording mode is executed and, then, the playback mode is started while said switching means is situated to supply said preemphasis means with said video signal outputted from said deemphasis means, and further said switching means is changed over to supply said preemphasis means with said video signal newly supplied from signal input means as soon as said recording medium reaches said designated record start timing.

2. A video signal recording and reproducing apparatus for recording and reproducing video signals onto and from a magnetic tape which records said video signals in a form of consecutive frames or fields comprising:

preemphasis means for modifying said video signal prior to recording onto said magnetic tape, so as to increase magnitude of high-frequency components of said video signal with respect to magnitude of low-frequency components thereof;

record signal processing means for receiving said video signal outputted from said preemphasis means and modulating said video signal into an appropriate signal for the recording onto said magnetic tape;

reproduction signal processing means for demodulating said video signal read out from said magnetic tape;

deemphasis means for modifying said video signal outputted from said reproduction signal processing means to decrease magnitude of high-frequency components of said video signal with respect to magnitude of low-frequency components thereof, said deemphasis means being complementary with said preemphasis means in their modification characteristics;

said preemphasis means and deemphasis means comprising a delay circuit having a delay time corresponding to 2m fields or $\{(2m+1)$ fields$-0.5H\}$, where m=0, 1, 2, . . . and H is one horizontal period, a coefficient circuit reducing magnitude of a video signal outputted from said delay circuit, and a feedback circuit feeding an output of said coefficient circuit back to said delay circuit;

switching means, operatively connected to said preemphasis means so as to selectively supply said preemphasis means with a video signal newly supplied from signal input means or said video signal outputted from said deemphasis means; and control means for controlling said video signal recording and reproducing apparatus to execute a playback mode for a predetermined period immediately before starting a recording mode for recording said video signal inputted from said signal input means, while controlling said switch means to select said video signal outputted from said deemphasis means during execution of said playback mode, said control means further controlling said switch means to select said video signal newly supplied from said signal input means upon termination of said predetermined period, wherein said magnetic tape is rewound a predetermined amount from a designated record start timing when the recording mode is executed and, then, the playback mode is started while said switching means is situated to supply said preemphasis means with said video signal outputted from said deemphasis means, and further said switching means is changed over to supply said preemphasis means with said video signal newly supplied from said signal input means as soon as said magnetic tape reaches said designated record start timing.

* * * * *